(12) United States Patent
Le Brech et al.

(10) Patent No.: US 11,503,754 B2
(45) Date of Patent: Nov. 22, 2022

(54) PROCESS FOR WEIGHING THE HARVESTED CROP STORED IN A TANK ON A HARVESTING MACHINE

(71) Applicant: CNH Industrial America LLC, New Holland, PA (US)

(72) Inventors: Laurent Le Brech, Le Poiré-sur-Vie (FR); Romain Clavier, Saint-Philbert-de-Grand-Lieu (FR); Daniel H. A. M. Le Nevé, Challans (FR)

(73) Assignee: CNH Industrial America LLC, New Holland, PA (US)

( * ) Notice: Subject to any disclaimer, the term of this patent is extended or adjusted under 35 U.S.C. 154(b) by 740 days.

(21) Appl. No.: 16/474,396

(22) PCT Filed: Dec. 27, 2017

(86) PCT No.: PCT/EP2017/084676
§ 371 (c)(1),
(2) Date: Jun. 27, 2019

(87) PCT Pub. No.: WO2018/122280
PCT Pub. Date: Jul. 5, 2018

(65) Prior Publication Data
US 2019/0335650 A1    Nov. 7, 2019

(30) Foreign Application Priority Data

Dec. 28, 2016  (EP) .................................... 16306827

(51) Int. Cl.
*A01B 63/00*  (2006.01)
*A01D 69/03*  (2006.01)
(Continued)

(52) U.S. Cl.
CPC .............. *A01B 63/00* (2013.01); *A01D 69/03* (2013.01); *G01G 5/06* (2013.01); *G01G 19/16* (2013.01)

(58) Field of Classification Search
CPC ...... G01G 19/083; G01G 19/10; G01G 19/16; G01G 5/06; A01D 9/03; A01B 63/00
See application file for complete search history.

(56) References Cited

U.S. PATENT DOCUMENTS

| | | | |
|---|---|---|---|
| 6,232,566 B1 * | 5/2001 | Bruns ................. | G01G 19/083 177/139 |
| 2008/0314649 A1 | 12/2008 | Hansen | |

(Continued)

FOREIGN PATENT DOCUMENTS

| | | | |
|---|---|---|---|
| DE | 26 58 820 A1 | 6/1978 | |
| DK | 201670282 | * 5/2016 | ............. G01G 19/16 |

(Continued)

OTHER PUBLICATIONS

Computer translation of DE 2658820 downloaded Apr. 7, 2022.*
(Continued)

*Primary Examiner* — Randy W Gibson
(74) *Attorney, Agent, or Firm* — Peter Zacharias; Patrick Sheldrake

(57) ABSTRACT

A process for weighing a harvested crop stored in a tank of a harvesting machine, a frame supporting the tank is mounted on a wheel set by a lifting device which is operable to move the frame upwardly and downwardly upon control of a hydraulic system. The process controlling the hydraulic system and includes the steps of: determining at least one height position of the frame on the displacement course; measuring a lowering pressure and a raising pressure in the hydraulic system at the position; calculating, from the measured pressures, a balancing pressure for the frame. The process is performed before unloading the stored crop in
(Continued)

order to calculate a loaded balancing pressure and after the unloading in order to calculate an empty balancing pressure. The weight of the stored crop is calculated from a pressure variation between the loaded balancing pressure and the empty balancing pressure.

15 Claims, 3 Drawing Sheets

(51) Int. Cl.
*G01G 5/06* (2006.01)
*G01G 19/16* (2006.01)

(56) References Cited

U.S. PATENT DOCUMENTS

2016/0011024 A1   1/2016   Kirk et al.
2020/0018633 A1*  1/2020   Larsen .................. G01G 23/01

FOREIGN PATENT DOCUMENTS

| EP | 0 537 857 A2 | 4/1993 |
| FR | 2 768 015 A1 | 3/1999 |
| GB | 2 10 568 A | 1/1983 |

OTHER PUBLICATIONS

International Search Report and Written Opinion dated Mar. 27, 2018 for International Application No. PCT/EP2017/084676 (10 pages).

* cited by examiner

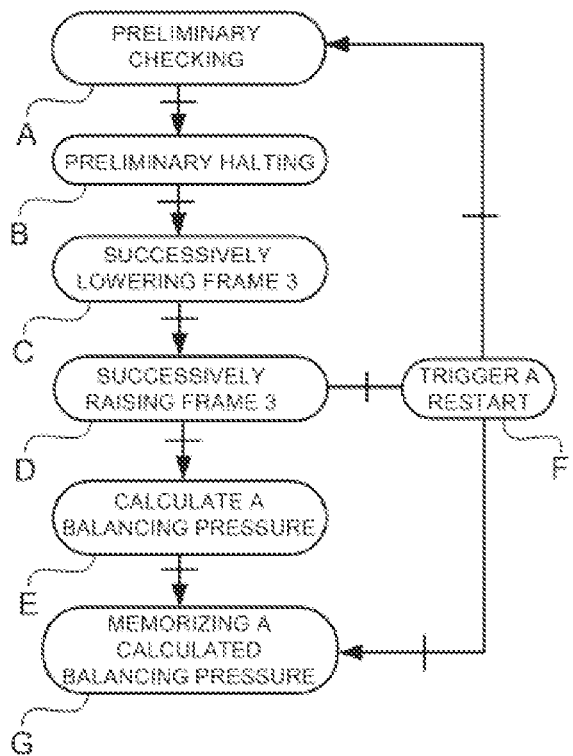
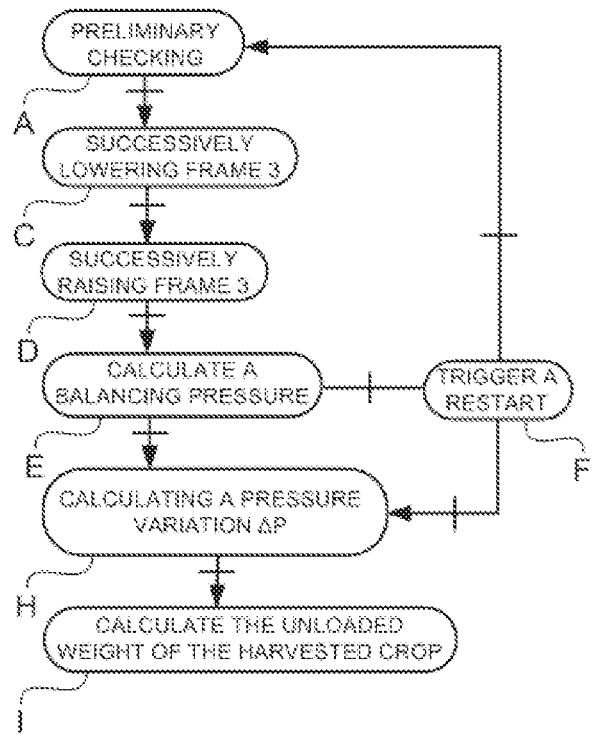
Fig. 3a                    Fig. 3b
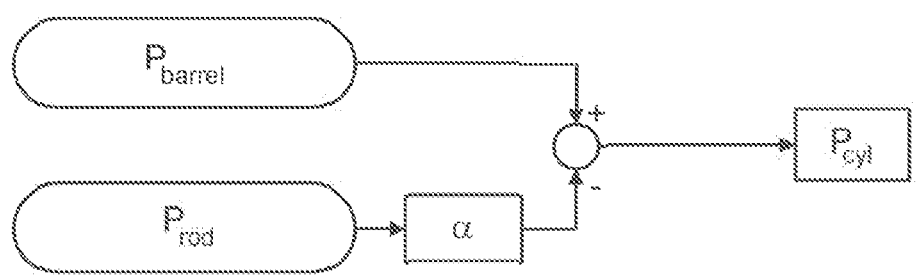
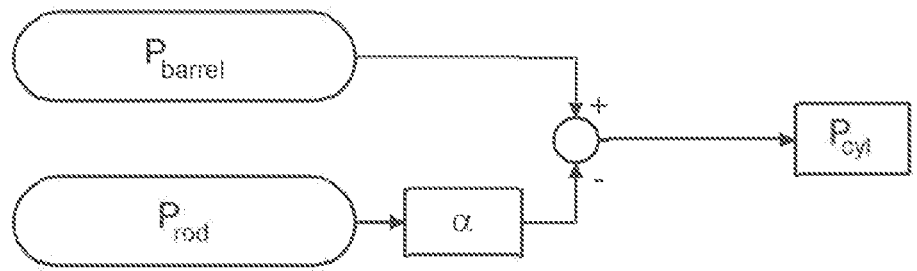
Fig. 4

PROCESS FOR WEIGHING THE HARVESTED CROP STORED IN A TANK ON A HARVESTING MACHINE

TECHNICAL FIELD

The invention relates to a process for weighing the harvested crop stored in at least one tank supported by a frame of a harvesting machine, as well as a harvesting machine comprising a frame supporting at least one crop storage tank and means for performing such a process for weighing the harvested crop stored in said tank at the unloading of said crop.

It applies in particular for the harvesting of fruit berries, such as grapes, raspberries, red, white or blackcurrants, and so on.

BACKGROUND ART

For producing high quality wines, such as PDO (for Protected Designation of Origin) wines, wine-growers must comply with very strict regulatory texts, especially as regards harvest yields per hectare, which must not exceed a threshold fixed by such texts.

Thus, for obtaining a selective grape harvest with the best yield authorized by the regulatory text applicable to the concerned denomination zone, it is necessary to be able to know in real time the weight of harvested grape.

Moreover, for a wine grower, it is also important to identify the areas in a vineyard which have a higher or a lower yield.

To do so, systems are already known for measuring continuously the yield per hectare for combine harvesters, but they are not suitable for the particular case of berries harvesting, especially grape harvesting, because the harvest products are totally different, in particular as the harvested berries can comprise moisture, such as juices of crushed fruits.

Moreover, it is relatively difficult to continuously weigh the collected harvest on a grape harvesting machine in movement, because the weighing process can be greatly perturbed by the vibrations of the harvesting unit and the tilting of the machine, when said machine works on uneven grounds, comprising slopes, shoulders, gutters and areas of different solidity.

To overcome these drawbacks, document FR-2 768 015 proposes to implement an electronic scale system in a harvesting machine, said system comprising in particular a first electronic scale for supporting a fixed and known weight and for continuously weighing said known weight, a second electronic scale placed on the path of the collected harvest for continuously weighing said harvest, and an electronic calculator which Performs an algorithmic process on the signals provided by the two scales, for eliminating the effect of dynamic perturbations to which said scales are submitted during the movement of the harvesting machine.

However, this system is not either totally satisfactory, as it requires the installation of a dedicated equipment in a grape harvesting machine, which is relatively complex and expensive to implement.

The invention aims to improve the prior art by proposing a process for weighing in real time the harvest collected by a harvesting machine, and thus in a relative simple, quick and reliable manner, without requiring the installation of complex and cumbersome equipment on said harvesting machine.

SUMMARY OF THE INVENTION

For that purpose, and according to a first aspect, the invention relates to a process for weighing the harvest stored in at least one tank supported by a frame of a harvesting machine, said frame being mounted on a wheel set by means of a lifting device which is arranged to move said frame upwardly and downwardly upon controlling a hydraulic system of said machine, said process comprising an acquisition procedure wherein, upon controlling the hydraulic system for lowering and raising the frame on a displacement course, the process providing for:
  determining at least one height position of the frame on said displacement course;
  measuring the lowering A1, B3 and the raising A2, B4 pressures in the hydraulic system at said position;
  calculating, from said measured pressures, a balancing pressure $P_f$, $P_e$ for said frame;
  wherein:
  said acquisition procedure is performed before unloading the stored harvest in order to calculate a loaded balancing pressure $P_f$ and after said unloading in order to calculate an empty balancing pressure $P_e$; and
  the weight W of the stored crop is calculated from a pressure variation $\Delta P$ between said balancing pressures.

According to a second aspect, the invention relates to a harvesting machine comprising a wheel set on which a frame supporting at least one crop storage tank is mounted by means of a lifting device operable by a hydraulic system, said machine further comprising a controller operable to control the hydraulic system which for performing such a process for weighing the crop stored in said tank at the unloading of said crop.

BRIEF DESCRIPTION OF THE FIGURES

Other aspects and advantages of the invention will become apparent in the following description made with reference to the appended Figures, wherein:

FIGS. 3a and 3b represent schematically the different steps of the process of the invention, respectively from the beginning to the end of the first acquisition procedure, before unloading the stored harvest (FIG. 3a), and from the beginning of the second acquisition procedure, after said unloading, to the final harvest weight calculation (FIG. 3b);

FIG. 4 represents schematically the measuring of the lowering and/or raising pressures in the hydraulic system according to an embodiment of the invention.

DETAILED DESCRIPTION OF AN EMBODIMENT OF THE INVENTION

Figure 1:
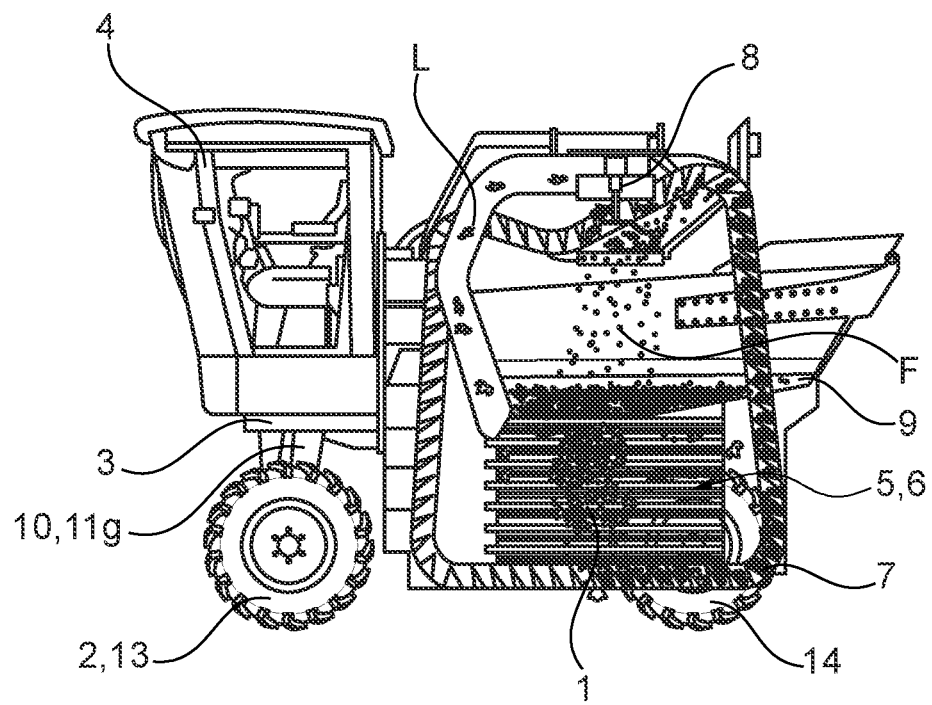
FIG. 1 represents a side view of a harvesting machine according to the invention.

With reference to these Figures, we describe below a harvesting machine comprising a wheel set on which a frame supporting at least one crop storage tank is mounted by means of a lifting device operable by a hydraulic system, said machine further comprising a controller operable to control the hydraulic system in particular for moving said frame upwardly and downwardly by means of said lifting device.

The harvesting machine is in particular operable for the selective and mechanical harvesting of fruits berries, such as grapes, raspberries, red, white or blackcurrants, on so on, in particular fruits growing on plants, such as trees or bushes, which are arranged in rows.

To do so, the harvesting machine comprises a motorized support structure that is movable along rows of such plants 1, said support structure comprising a wheel set 2 and a frame 3 which supports a driver station 4 and a harvesting unit 5 for straddling at least one of said rows of plants and detaching fruits F from said plants.

The wheel set 2 comprises in particular two front wheels 13 and two rear wheels 14, at least one of said wheels being mounted on the frame 3 by means of a front or rear lever arm. Advantageously, the harvesting machine is driven by means of a four-wheel-drive transmission, which allows for using said machine on uneven grounds.

The harvesting unit 5 can be mounted on the frame 3 permanently or removably, so as to be replaceable by other equipment and accessories, for example spraying equipment, pruning equipment or equipment for working the soil.

The harvesting unit 5 includes a straddling chassis which delimits a harvesting tunnel into which the plants 1 are successively introduced to move through said tunnel between respective openings at the front and at the rear of said tunnel. Moreover, the harvesting unit 5 includes a shaker system including two shaker devices 6, said shaker devices being arranged on respective sides of the harvesting tunnel to delimit said tunnel transversely.

The frame 3 also supports a recovery unit 7 for recovering the harvest detached by the harvesting unit 5 and a unit 8 for cleaning and/or sorting said detached harvest to eliminate components L other than fruits F, in particular leaves, leaf stalks and wood particles, before the storage of said harvest in at least one tank 9 provided for that purpose on the frame 3.

In particular, the frame 3 is mounted on the wheel set 2 by means of a lifting device 10 which is arranged to move said frame upwardly and downwardly upon controlling a hydraulic system of the harvesting machine. In a known manner, the harvesting machine may include a central motor or engine, for example an electrical motor and/or a thermic engine, which is operable to drive in parallel a main hydraulic or hydrostatic system for managing the rotation of the wheels of the set 2 and at least one auxiliary hydraulic system for managing the functioning of at least one auxiliary equipment 5, 6, 7, 8, 10 embedded in the machine, especially the lifting device 10, in particular by driving hydraulic pumps and controlling valves for feeding pressurized oil to respectively said wheel set and said auxiliary equipment.

Figure 2:
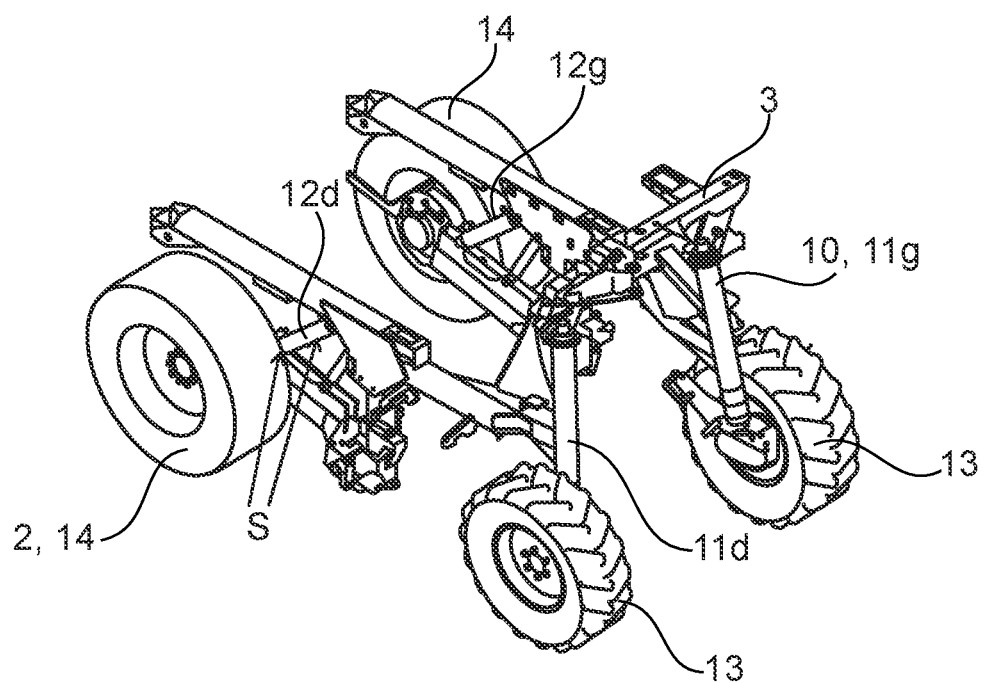
FIG. 2 represents schematically in perspective the frame and the wheel set of the harvesting machine of FIG. 1, as well as the lifting device by means of which the frame is mounted on the wheel set.

In the embodiment shown, the lifting device 10 comprises hydraulic cylinders which are mounted between the frame 3 and the components of the wheel set 2 to be activated by the hydraulic system implemented in the machine. In particular, as shown in FIG. 2, the lifting device 10 comprises two front 11g, 11d and two rear 12g, 12d hydraulic cylinders which are mounted respectively to the front and the rear wheels of the wheel set 2, in particular left front and rear cylinders 11g, 12g and right front and rear cylinders 11d, 12d mounted respectively to the left and the right side wheels of said set. The wording "wheel" as used herein may refer to a genuine wheel, which may or may not be provided with a tire, or a track for better ground adherence During the harvest, the harvesting machines may regularly unload their embedded storage tanks 9, in particular into hoppers that are positioned at given points of the harvest field, for example at the ends of some of the rows of plants 1 of said field. For ensuring a selective harvest with the best authorized yield per hectare, in particular for producing high-quality wines, it is necessary to be able to know the weight of the harvest collected by the machines, in particular for not exceeding the threshold fixed by regulatory texts.

For that purpose, we describe below a process for weighing the harvest stored in the tank(s) 9 of a harvesting machine as mentioned above.

With reference to FIG. 3, the process comprises an acquisition procedure wherein the weight of the crop stored in the tank 9 embedded in said machine is measured while controlling a hydraulic system of said machine, in particular for lowering and raising the supporting frame 3 on a displacement course, and by Performing pressure measurements in said hydraulic system on said course.

Similar acquisition procedures are performed before (FIG. 3a) and after (FIG. 3b) the unloading of the crop from the tank 9.

For Performing the acquisition procedure with the best possible accuracy, the process provides for a preliminary checking step A wherein different controls are Performed, in particular on the hydraulic system, for checking if the different required conditions are met for performing said acquisition procedure. This step A may comprise checking whether the motor or engine is running at a predetermined speed and other hydraulic users have been disabled such that they cannot influence the available pressure at the hydraulic pump.

Afterwards, as stated in FIG. 3a, the process provides a preliminary halting step B wherein the hydraulic or hydrostatic system of the machine is controlled for halting a displacement of the wheel set 2 before Performing the acquisition procedure, so as to secure said system and to limit the occurrence of parasitic parameters, in particular parasitic pressures due to such a displacement.

In particular, during the lowering and raising displacement course of the frame 3, the wheelbase of the set 2 can vary, which may cause traction forces at the front wheels 13, which are transferred upon the hydraulic cylinders 11g, 11d. Parasitic pressure due to such forces may occur in the hydraulic system, which can alter the reliability of the measurements. To avoid such drawbacks, the preliminary halting step B provides for controlling the hydraulic system for blocking rear wheels 14 of the wheel set 2 and for liberating the front wheels 13 of said set, so as to limit the occurrences of such parasitic pressure during the acquisition procedure. Alternatively, the front wheels 13 may be blocked and the rear wheels 14 may be set for free rotation.

Once the step B for halting the set 2 has been performed, the process provides for Performing the acquisition procedure, first before unloading the stored crop from the tank 9 (FIG. 3a, upper part of FIG. 5), and then after said unloading (FIG. 3b, lower part of FIG. 5), thus while controlling the hydraulic system for lowering and raising the frame 3 on a displacement course.

In particular, between two occurrences of the acquisition procedure, the process can provide for repeating the checking step A, in particular on the hydraulic system, for checking if the different required conditions are met for Performing the second acquisition procedure.

In the embodiment shown, the acquisition procedure provides for controlling the hydraulic system for successively lowering (step C) and raising (step D) the frame 3. However, according to a variant, the acquisition procedure can provide for controlling the hydraulic system for raising the frame 3 first and then for lowering said frame.

The acquisition procedure provides for measuring the hydraulic pressures in the hydraulic system, in particular in the lifting device 10, during these lowering C and raising D steps. Pressures A1 and A2 are measured before unloading, respectively during lowering and raising movements, and pressures B3 and B4 are measured after unloading, respectively during lowering and raising movements.

During the acquisition procedure, the process first provides for determining at least one height position of the frame 3 on the displacement course, i.e. a measurement position, and then for measuring the lowering A1, B3 and the raising A2, B4 pressures in the hydraulic system at said position. To determine a measurement position, the acquisition procedure can in particular provide for determining such a height position by monitoring the displacement course of at least one hydraulic cylinder 11g, 11d, 12g, 12d, in particular by means of appropriate sensors S embedded in said hydraulic cylinder(s).

In particular, the process can advantageously provide for controlling the hydraulic system for activating the hydraulic cylinders 11g, 11d, 12g, 12d on the same displacement course, which allows displacement of the frame 3 on a course substantially parallel to the ground. Moreover, in such a case, the measurement of the displacement course of only one hydraulic cylinder 11g, 11d, 12g, 12d may be sufficient to determine the height position of the frame 3.

Otherwise, the process can more generally provide for measuring a displacement course for each of the hydraulic cylinders 11g, 11d, 12g, 12d and for determining a height position from an average height calculated from said measured courses.

According to a variant, the acquisition procedure can provide for determining such a height position by measuring an angular position of a rear lever arm of at least one rear wheel 14, in particular by means of appropriate sensors embedded in the pivot of said arm or provided at said rear lever arm.

In particular, the acquisition procedure can provide for measuring an angular position for each of the rear wheel lever arms. Indeed, if the hydraulic cylinders 11g, 11d, 12g, 12d are mounted in series and correctly synchronized, in particular by being dimensioned to effect the same displacement course, the displacement of the frame 3 will be substantially parallel to the ground, so that said angular positions may be sufficient for determining the height position of the frame 3.

In the embodiment shown, the acquisition procedure provides for determining a pressure measurement course, defined by two height positions of the frame 3 on the displacement course, respectively a low-height position and a high-height position, and the measurement of the pressures A1, A2, B3, B4 during movement of the frame 3 between said low-height and said high-height positions. The lowering A1, B3 and raising A2, B4 pressures are then established as the average measured pressures obtained over the measurement course during the lowering C and raisin D steps. Such pressure values are less prone to disturbances than values derived from a momentary measurement at a single height position.

In particular, the low-height position can correspond to about 25% of the maximum displacement reachable by the frame 3, said maximum displacement being notably vertical when the machine stays on a substantially horizontal ground, and the high-height position can correspond to about 60% of said maximum displacement. More precisely, the low-height and high-height positions can correspond respectively to 37.5% and 49% of the maximum displacement, which for a particular lifting device 10 correspond respectively to displacements of approximately 225 mm and 275 mm.

With reference to FIGS. 3a and 3b, during each acquisition procedure, the process provides a step C for lowering the frame 3 until reaching at least the low-height position, preferably on each side of said frame, and for measuring a lowering pressure A1, B3 until reaching said low-height position. In the same way, the process further provides a following step D for raising the frame 3 until reaching at least the high-height position, preferably on each side of said frame, and for measuring a raising pressure A2, B4 until reaching said high-height position.

The acquisition procedure can in particular provide for measuring the lowering A1, B3 and raising pressures A2, B4 in at least one of the hydraulic cylinders 11g, 11d, 12g, 12d, in particular by means of appropriate sensor(s) S embedded in said cylinder.

In particular, especially in the case where the cylinders 11g, 11d, 12g, 12d are activated on the same displacement course and the wheel set 2 is positioned on a substantially plane ground, the acquisition procedure can advantageously provide for measuring lowering A1, B3 and/or raising A2, B4 pressures in only one hydraulic cylinder 11g, 11d, 12g, 12d, which may be sufficient to determine the global lowering A1, B3 and raising A2, B4 pressures in the hydraulic system.

Otherwise, the acquisition procedure can more generally provide for measuring discrete lowering and raising pressures $P_{cyl}$ in each of the cylinders 11g, 11d, 12g, 12d and for determining global lowering A1 and raising A2 pressures from averaging said measured discrete pressures.

For example, when the wheel set 2 is positioned on an uneven ground, different lowering and raising pressures $P_{cyl}$ can be measured in each cylinder, in particular in the left 11g, 12g and right 11d, 12d cylinders, due to the solidity, slope, shoulders or gutters of said ground.

Figure 5:
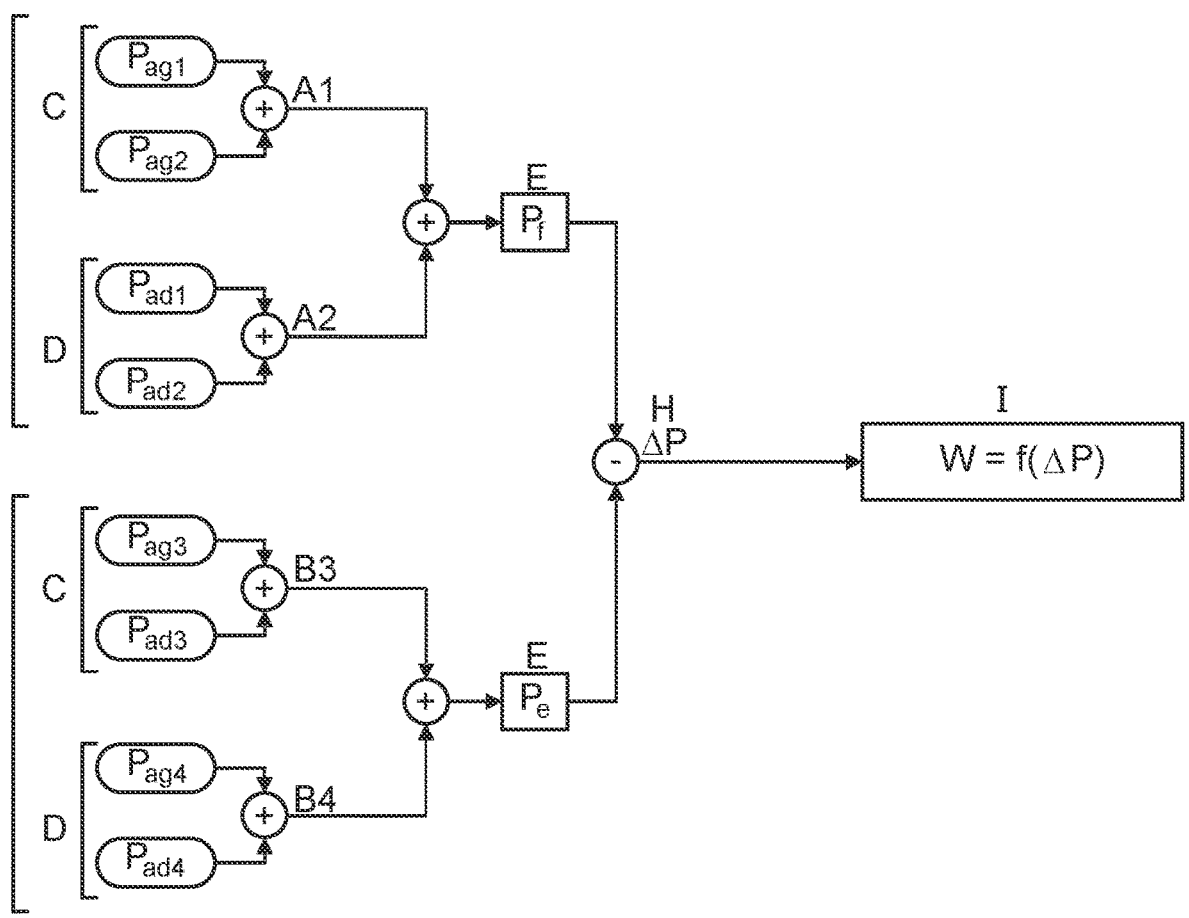
FIG. 5 represents schematically the successive calculation steps for obtaining the weight of the stored harvest from the lowering and raising pressures measured during the acquisition procedures according to an embodiment of the invention.

Thus, as represented on FIG. 5, the acquisition procedure can provide, to limit the precision losses due to such conditions by independently measuring discrete lowering $P_{ag1}$, $P_{ag3}$, $P_{ad1}$, $P_{ad3}$ and raising $P_{ag2}$, $P_{ag4}$, $P_{ad2}$, $P_{ad4}$ pressures respectively for left 11g, 12g and right 11d, 12d cylinders and for determining global lowering A1, B3 and raising A2, B4 pressures from the averages of said pressures.

The pressure sensors S may be placed directly in the chambers of the hydraulic cylinders 11g, 11d, 12g, 12d, so as to avoid errors due to load losses during the transfers of hydraulic fluids. Alternatively, pressure sensors may also be provided on the hydraulic lines adjacent their connection to the hydraulic cylinders 11g, 11d, 12g, 12d.

In particular, as stated on FIG. 4, each hydraulic cylinder 11g, 11d, 12g, 12d comprises a barrel wherein a piston provided with a rod slides on a displacement course, and the acquisition procedure may provide for measuring lowering and/or raising pressures $P_{barrel}$ at said barrel side and lowering and/or raising pressures $P_{rod}$ at said rod side. Then, the acquisition procedure may provide for calculating the lowering and/or raising pressures $P_{cyl}$ in each cylinder by means of the following formula:

$$P_{cyl} = P_{barrel} - \alpha * P_{rod}$$

wherein α is a predetermined coefficient depending on the dimensions of the components of the cylinder and of the mounting of the cylinder, and which can be derived from a calibration of the hydraulic system.

With reference to FIGS. 3 and 5, once the lowering A1, B3 and raising A2, B4 pressures in the hydraulic system have been measured, the acquisition procedure provides a step E for calculating, notably from said measured barrel and rod pressures, a balancing pressure $P_f$, $P_e$ for the frame 3, respectively before (FIG. 3a, high part of FIG. 5) and after the unloading of the harvested crop from the tank 9 (FIG. 3b, low part of FIG. 5) in order to provide respectively a loaded balancing pressure $P_f$ and an empty balancing pressure $P_e$.

The acquisition procedure can in particular provide for calculating the balancing pressures $P_f$, $P_e$ from an average of the corresponding measured pressures $P_{ag1}$, $P_{ad1}$, $P_{ag2}$, $P_{ad2}$, A1, A2; $P_{ag3}$, $P_{ad3}$, $P_{ag4}$, $P_{ad4}$, B3, B4.

In particular, the loaded balancing pressure $P_f$ and the empty balancing pressure $P_e$ may be obtained from the lowering A1, B3 and raising A2, B4 pressures measured during steps C, D. These pressure values may be linked to the loaded $P_f$ and empty $P_e$ balancing pressures according to the following formulae:

Measured loaded lowering pressure $A1 = P_f - P_{lowfricf}$

Measured loaded raising pressure $A2 = P_f + P_{raisfricf}$

Measured empty lowering pressure $B3 = P_e - P_{lowfrice}$

Measured empty raising pressure $B4 = P_e - P_{raisfrice}$ wherein $P_{lowfricf}$, $P_{raisfricf}$, $P_{lowfrice}$, $P_{raisfrice}$ are pressures generated by parasitic frictions during respectively the lowering and raising movements of the loaded frame 3 and the lowering and raising movements of the empty frame 3.

Moreover, the acquisition procedure can advantageously provide for controlling the hydraulic system to obtain the same upward and downward displacement speed of the frame 3, such that the pressures $P_{lowfricf}$, $P_{raisfricf}$, $P_{lowfrice}$, $P_{raisfrice}$ generated by parasitic frictions may be substantially equal, so that said parasitic frictions may cancel each other out upon averaging the lowering A1, B3 and raising A2, B4 pressures for calculating the respective balancing pressures $P_f$, $P_e$. To do so, the pump of the hydraulic system can in particular be driven at a constant thermic engine speed, e.g. of approximately 1400 rpm.

Moreover, the averaging of lowering and raising pressures A1, A2, B3, B4 allows for reducing the influence of hysteresis of pressure sensors S on said measured pressures, and thus for increasing the accuracy of said measures.

Once the balancing pressure $P_f$, $P_e$ has been calculated, the acquisition procedure can provide, in particular at step E, for checking whether the required data are complete before pursuing the process and, if necessary, for triggering a restart procedure F and to begin another acquisition procedure in case of problem.

Otherwise, if the data are complete, the acquisition procedure may trigger a following step G for memorizing the calculated balancing pressure $P_f$ in particular at the end of the first occurrence for the loaded frame 3 (FIG. 3a), or a step H for calculating a pressure variation ΔP between the empty balancing pressure $P_e$ that has just been calculated for the empty frame 3 and the loaded balancing pressure $P_f$ that was calculated at the end of the first occurrence for the loaded frame 3 (FIGS. 3b, 5).

In particular, the calculation of a pressure variation ΔP allows for increasing the reliability and the precision of the final weight measurement, as it allows for reducing the influence of external conditions, such as for example the unevenness of the ground, including its slope and solidity, and the filling of the fuel reservoir of the machine, that may potentially alter said measurement and reduce its precision.

Moreover, during the step H, the process can provide for re-enabling partially the movement of the set 2, as its halting is not required any more for the following steps.

Afterwards, the process provides a step I (FIGS. 3b, 5), wherein the weight W of the stored and unloaded harvested crop is calculated from the previously calculated pressure variation ΔP, and then displayed and/or stored, for being provided for example to a stationary hopper into which the weighted harvested crop has been unloaded, so that said weight can be further used to calculate the total weight of crop collected during the harvest session in the field.

The weight W can also be compared to the area harvested between the last and the previous unloading processes to calculate the average crop yield for that area. Such area can be established using precision farming systems using a GPS (for Global Positioning System) system.

In particular, with an appropriate calibration coefficient α for the hydraulic system, the weight W can be obtained from the pressure variation ΔP by means of a linear function f, and more specifically to a proportional function, which allows for simplifying this calculation.

Other embodiments of the invention may be conceived, without departing from the scope of the invention as defined by the accompanying claims. For instance, where the unloading of the harvested crop normally takes place with the frame 3 in a raised position, it will be advantageous to Perform first the lowering step C and then the raising step D before and after unloading the harvested crop, as described above. However, where the unloading should take place with the frame 3 in a low position, it will save time to Perform first the raising step D and then the lowering step C. One may also block the front wheels 13 and set the rear wheels 14 free during the measurement process, instead of blocking the rear wheels 14 and setting the front wheels 13 free as described above.

The invention claimed is:

1. A process for weighing a harvested crop stored in at least one tank supported by a frame of a harvesting machine, the frame being mounted on a wheel set by a lifting device which is operable to move the frame upwardly and downwardly upon control of a hydraulic system of the harvesting machine, the process comprising an acquisition procedure wherein, upon controlling the hydraulic system for lowering and raising the frame on a displacement course, the process including the steps of:
   halting a displacement of the wheel set before performing the acquisition procedure;
   determining at least one height position of the frame on said displacement course;
   measuring a lowering pressure and a raising pressure in the hydraulic system at said position;
   calculating, from said measured pressures, a balancing pressure for said frame;
   wherein:
      said acquisition procedure is performed before unloading the stored crop in order to calculate a loaded balancing pressure and after said unloading in order to calculate an empty balancing pressure; and
      the weight of the stored crop is calculated from a pressure variation between said loaded balancing pressure and said empty balancing pressure.

2. The process according to claim 1, wherein the lifting device comprises hydraulic cylinders which are mounted between the frame and the wheel set for activation by the hydraulic system, the lowering and raising pressures being measured in or at least one of said hydraulic cylinders.

3. The process according to claim 2, wherein the lowering and raising pressures are measured in each of said hydraulic cylinders, the acquisition procedure providing for averaging said lowering and said raising pressures for calculating the balancing pressure from said averages.

4. The process according to claim 2, wherein the hydraulic cylinders are activated on the same displacement course by the hydraulic system.

5. The process according to claim 2, wherein the acquisition procedure provides for measuring the displacement course of at least one of said hydraulic cylinders to determine the height position of the frame.

6. The process according to claim 2, wherein each said hydraulic cylinder comprises a barrel wherein a rod slides on a displacement course, the acquisition procedure providing for measuring lowering and/or raising pressures (Pbarrel) at the barrel side and lowering and/or raising pressures (Prod) at the rod side, and for calculating the lowering and/or raising pressures (Pcyl) in each said hydraulic cylinder by the following formula:

$$Pcyl = P - \alpha * Prod$$

wherein a is a predetermined coefficient determined from a calibration of the hydraulic system.

7. The process according to claim 1, wherein the acquisition procedure provides for determining a pressure measurement course defined by two height positions of the frame on the displacement course, the lowering and the raising pressures being calculated from the pressures measured during displacement of the frame between said two height positions.

8. The process according to claim 7, wherein the determined height positions are respectively a low-height position corresponding to approximately 25% of the maximum displacement reachable by the frame and a high-height position corresponding to approximately 60% of said maximum displacement.

9. The process according to claim 1, wherein the acquisition procedure provides for calculating the balancing pressures from an average of the measured pressures.

10. The process according to claim 1, wherein the acquisition procedure provides for controlling the hydraulic system so that pressures generated by parasitic frictions during respectively lowering and raising displacements are substantially equal.

11. The process according to claim 10, wherein the hydraulic system is controlled to obtain the same upward and downward displacement speed of the frame.

12. The process according to claim 1, wherein the acquisition procedure provides for controlling the hydraulic system for successively lowering and raising the frame.

13. The process according to claim 1, wherein the wheel set comprises at least one rear wheel that is mounted in rotation on the frame by a rear lever arm, the acquisition procedure providing for measuring an angular position of said rear lever arm to determine the height position of the frame.

14. The process according to claim 1, wherein the preliminary step provides for controlling the hydraulic system for blocking rear wheels of the wheel set and for liberating front wheels of said wheel set, so as to limit the occurrence of parasitic pressures resulting from forces on said front wheels in said hydraulic system during the acquisition procedures.

15. A harvesting machine, comprising:
a wheel set on which a frame supporting at least one crop storage tank is mounted by a lifting device operable by a hydraulic system, said machine being characterized in that it further comprises a controller operable to control the hydraulic system for performing a process for weighing the harvested crop stored in said tank before the unloading of said crop, the process comprising an acquisition procedure wherein, upon controlling the hydraulic system for lowering and raising the frame on a displacement course, the process including the steps of:
halting a displacement of the wheel set before performing the acquisition procedure;
determining at least one height position of the frame on said displacement course;
measuring a lowering pressure and a raising pressure in the hydraulic system at said position;
calculating, from said measured pressures, a balancing pressure for said frame;
wherein:
said acquisition procedure is performed before unloading the stored crop in order to calculate a loaded balancing pressure and after said unloading in order to calculate an empty balancing pressure; and
the weight of the stored crop is calculated from a pressure variation between said loaded balancing pressure and said empty balancing pressure.

* * * * *